US009259661B2

(12) United States Patent
Vogel

(10) Patent No.: US 9,259,661 B2
(45) Date of Patent: Feb. 16, 2016

(54) MOUNTING CLAMP FOR FLYING DISC

(71) Applicant: Daniel M Vogel, Seattle, WA (US)

(72) Inventor: Daniel M Vogel, Seattle, WA (US)

( * ) Notice: Subject to any disclaimer, the term of this patent is extended or adjusted under 35 U.S.C. 154(b) by 0 days.

(21) Appl. No.: 14/639,399

(22) Filed: Mar. 5, 2015

(65) Prior Publication Data

US 2015/0174503 A1 Jun. 25, 2015

(51) Int. Cl.

*F16M 13/00* (2006.01)
*A63H 33/18* (2006.01)
*B25B 5/14* (2006.01)
*B25B 11/00* (2006.01)
*A47G 1/16* (2006.01)

(52) U.S. Cl.

CPC ................ *A63H 33/185* (2013.01); *B25B 5/14* (2013.01); *B25B 11/00* (2013.01); *A47G 1/1646* (2013.01); *A63H 33/18* (2013.01); *Y10T 29/49826* (2015.01)

(58) Field of Classification Search

CPC combination set(s) only.
See application file for complete search history.

(56) References Cited

U.S. PATENT DOCUMENTS 1,607,874 A * 11/1926 Darton ........................ F41J 9/28 124/5
2,300,972 A 11/1942 Robinson
2,826,384 A 3/1958 Brown
3,359,678 A 12/1967 Headrick
3,767,043 A * 10/1973 Margolis ................ B65D 75/02 206/315.1
3,828,466 A 8/1974 Geiger
4,106,742 A * 8/1978 Miller .................. A47G 1/1646 248/231.9
4,190,182 A * 2/1980 Hickey ...................... A45F 5/10 224/917
4,364,537 A * 12/1982 Helzer ................. A47G 1/1646 248/448
4,410,115 A * 10/1983 McClain, Jr. ............ B62J 11/00 224/268
4,473,207 A * 9/1984 Nascher ............... A47G 1/1646 248/488
4,872,688 A * 10/1989 Galvin ................. A63B 59/025 124/5
5,232,226 A * 8/1993 Glickson .............. A63B 59/025 124/5
5,282,634 A * 2/1994 Chamberland ...... A63B 59/025 124/42
5,975,849 A * 11/1999 Yang ...................... A45B 27/00 416/142
6,179,737 B1 * 1/2001 Adler ..................... A63B 65/10 446/46
7,434,699 B2 * 10/2008 Stukenberg .......... A47G 1/1646 211/41.1
7,895,995 B2 * 3/2011 Simon .................. A01K 15/025 119/702
2009/0008521 A1 * 1/2009 Lee ...................... F16M 11/041 248/226.11
2010/0144233 A1 * 6/2010 Scarborough .......... A63H 33/18 446/46
2013/0256497 A1 * 10/2013 Radmard ............... F16M 11/00 248/558
2014/0302739 A1 * 10/2014 Glickson ................ A63H 33/18 446/46

* cited by examiner

*Primary Examiner* — Monica Millner
(74) *Attorney, Agent, or Firm* — K Karel Lambert; Lambert Patent Services LLC

(57) ABSTRACT

A method or kit for mounting or displaying a collectable flying disc. The kit includes a box clamp frame capable of capturing a segment of an edge lip and web of a disc under gentle pressure, where gentle pressure is sufficient to immobilize the disc in a generally upright position when the box clamp frame is seated on a horizontal surface, or in a generally pendent position when the box clamp frame is hung from a vertical surface. Discs may be displayed with other memorabilia such as photographs on a wall or positioned on a desk or table, for example.

12 Claims, 9 Drawing Sheets

MOUNTING CLAMP FOR FLYING DISC

FIELD OF THE INVENTION

The embodiments of the present invention relate to trophy display kits and methods for displaying flying discs.

BACKGROUND

Baseball, basketball, soccer and football have attracted worldwide sports audiences, television viewers, farm teams, and annual traditions of spring or summer rituals for young players. Each sport has created a Hall of Fame for its most admired players. Special souvenirs and memorabilia are acquired by collectors, displayed, and preserved. "Ultimate" is an increasingly popular sport and fuses perhaps the best of football and soccer in a fast-moving format with emphasis on individual skill and team play. Groups of seven players scrimmage on a field that is about 70 yards goal-to-goal and about 40 yards wide. The teams advance toward the opposing team's goal line by tossing a flying disc from teammate to teammate. The disc curves, floats or even flies inverted to a teammate unless intercepted. Rapid development of a "catch and release" passing strategy is essential for winning.

Risk of injury is relatively low because player-to-player contact is limited, and players can only move when the disc is spinning. In 2014, the sport was officially recognized by the International Olympics Committee, and member associations include fifty-six countries representing more than 141,000 members. Survey results in 2013 estimated 5.1 million people played Ultimate in 2012, with a core (12 or more times) of 1.48 million, on a 5-year growth rate of 20% with no signs of slowing. In addition to college and amateur leagues and tournaments, two professional leagues have been organized in North America. Professional teams include the Madison Radicals, Seattle Rainmakers, Toronto Rush and Washington D.C. Current, and others.

Much of this growth extends from technical innovations in the game equipment. There is little doubt that the earliest disc derived from a product patented as U.S. Pat. No. 3,359,678 to WHAM-0® (Woodland Hills, Calif.) and sold under the tradename FRISBEE®. However, as play began to organize around teams, the radius of the disc was widened and the weight was about doubled. This results in more stable flight under windy conditions and the thicker edge lip improves the player's ability to put muscle into a throw. A greater variety of throws have been developed. Throws include forehand, backhand, overhand, hammer, thumber, blade, scoober, duck, and "chicken wing", for example. Throw techniques are shown on Wikipedia (http://en.wikipedia.org/wiki/Flying_disc_techniques, accessed 25 Feb. 2015) and for example in an animation by Brodie Smith (https://www.youtube.com/watch?v=sdlpyazJxfQ, accessed 25 Feb. 2015).

Examples of plate holders suggest a possible solution. Robinson in U.S. Pat. No. 2,300,972 and Brown in U.S. Pat. No. 2,826,384 described clips that are spring-mounted to the back of a plate, the clips having at least one hook element for securing the plate to a wall. However, these devices attach themselves to rigid elements and are not adapted to softer plastic discs. The springs may result in progressive deformation of the disc. Further, these non-analogous devices cannot be used to stand a soft plate or a disc on a table and thus do not meet the objectives of the invention. The devices also do not permit indicia to be applied to an integral display surface.

Key objects of the invention include the capacity to display a flying disc with versatility, either as a pendent disc hanging on a wall or as an upright disc standing on a table or shelf, for example. A means for securing the disc so as to be suitable for display of the disc is needed and in such a way that damage to the disc is avoided. Because of the pliability of the disc and its aerodynamic body shape, a solution to these interrelated problems is only achieved by trial and error.

SUMMARY

Disclosed is a box clamp configured for immobilizing an edge and lip of a flying disc for purposes of display, such as display of discs as team memorabilia and trophies. Flying discs are characterized by a thin top web connecting a surrounding edge with thickened circumferential lip , the lip and web having a wing-like curvature in section.

The flying discs of the Ultimate sport are standardized in size and weight. The disc has a fixed diameter of about 10.75 inches and weighs 175 grams. It is axisymmetrical on a rotational axis and spins while in flight. The lower lip and connecting top web create a pressure differential as the disc passes through air, air having a longer flow path across the top of the disc, enabling the disc to fly for longer distances at a constant altitude, and by release angle and applying spin, can be caused to rise, sink, hook with varied trajectories. The strengthened edge lip allows the player to securely catch the disc and then pivot and throw the disc greater distances.

However, the disc is made of a thermoplastic and is pliant to a degree. Thus a collector or player wishing to display for example an autographed disc (much as collectors display autographed baseballs or footballs) currently has limited choices. The disc cannot be balanced on its edge in a standing position and will deform if nailed to the wall, for example.

Advantageously, the box clamp frame of the invention is enabled to clamp a short segment or wedge of the edge lip and web such that the box clamp serves as a stand for vertically displaying the disc, and is also enabled to accept fasteners useful for hanging the box clamp with disc from a vertical support. Typically the top of the disc includes indicia identifying the significance of the disc, such as a year, a championship title, and a team name, or an autographed disc having all the signatures of the team players, for example.

The disc includes a peripherally disposed perimetrical rim or lip, a top web spanning the area defined by the lip outline and having a generally aerodynamic profile, and an underside within the lip outline that is hollow and defines an area used to grip the lip. A set of textured rings on the upper face of the top web is typically provided to improve handling of the disc and reduce drag.

The box clamp frame body includes four sides and is open at the top and bottom. The four sides include (1) a front platen, (2) a back plate (the front platen and back plate defining a front and back of the box clamp), (3) a first side bracket and (4) a second side bracket (the side plates defining two sides of said box clamp). The side brackets are slotted to each receive a wedge or segment of the thickened lip or rim and associated web segment. The side brackets with disc in place are then clamped between said front plate and said back plate such that the lower edges of the box defines a rectangular base for supporting the disc standing in an upright position and the front or back of said box clamp is capable of being hung from a supporting hanger and displaying the disc hanging on a vertical surface. When supplied as a kit, any hardware or glue necessary to assemble the box clamp is supplied, and the kit may include a length of wire and a wall-mounting hooklet or pin, for example.

In another embodiment, the invention is a method, and is conceived as a method for displaying an ultimate trophy disc in either an erect standing and upright position or a hanging and dependent position, having steps that include:

(a) securing a segment of a lip and web of a disc in a box clamp, the box clamp having two sides, a front and a back by:

(i) assembling the back plate and the side brackets to define a three-sided box having an open front, open top and open bottom thereof;

(ii) inserting a segment of an edge of a disc into slots in the side brackets, where the shape of the slots generally matches the shape of the lips;

(iii) clampingly immobilizing the disc under pressure by interdigitatingly affixing the front platen with said side brackets, thereby forming a four-sided box clamp around an edge segment of the disc; and, (b) displaying the box clamp with captive disc in a vertical or a pendent position.

The elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which.

Figure 1:
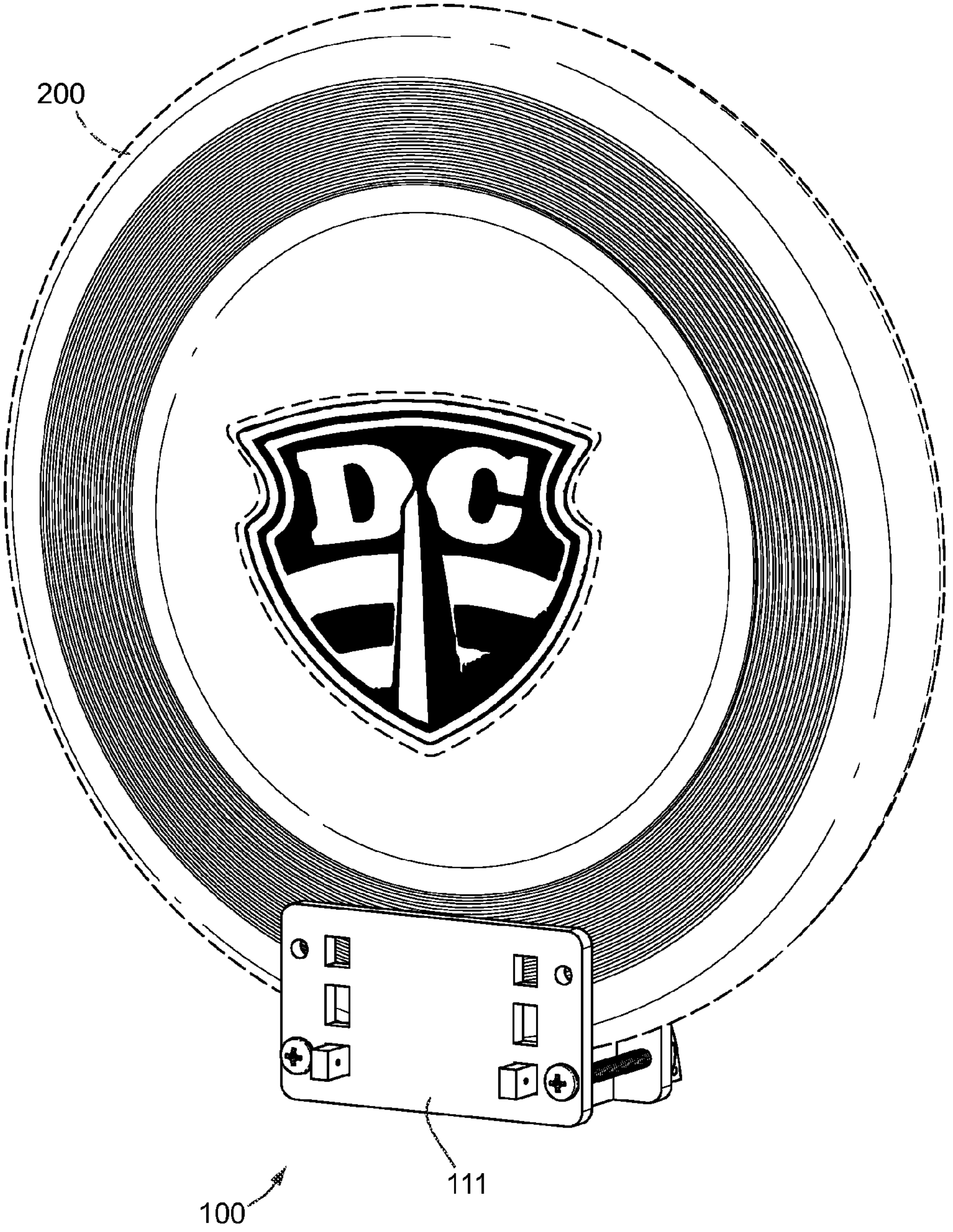
FIG. 1 is a perspective view of a mounting box clamp of the invention with flying disc depicted in phantom lines

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

Glossary

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification. Unless otherwise defined, all technical and scientific terms used herein have the same meaning as commonly understood by one of ordinary skill in the art to which this invention belongs. In case of conflict, the present specification, including definitions, will control.

Pendent—attached to a vertical surface so as to be pendent; as in a hanging position.

Upright—to stand or be supported in a generally vertical orientation.

General connection terms including, but not limited to "connected," "attached," "conjoined," "secured," and "affixed" are not meant to be limiting, such that structures so "associated" may have more than one way of being associated.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

It should be noted that the terms "may," "can," and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC §112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Referring to FIG. 1, shown is a quarter side perspective view of a mounting box clamp 100 of the invention and a flying disc 200 mounted therein.

Figure 2:
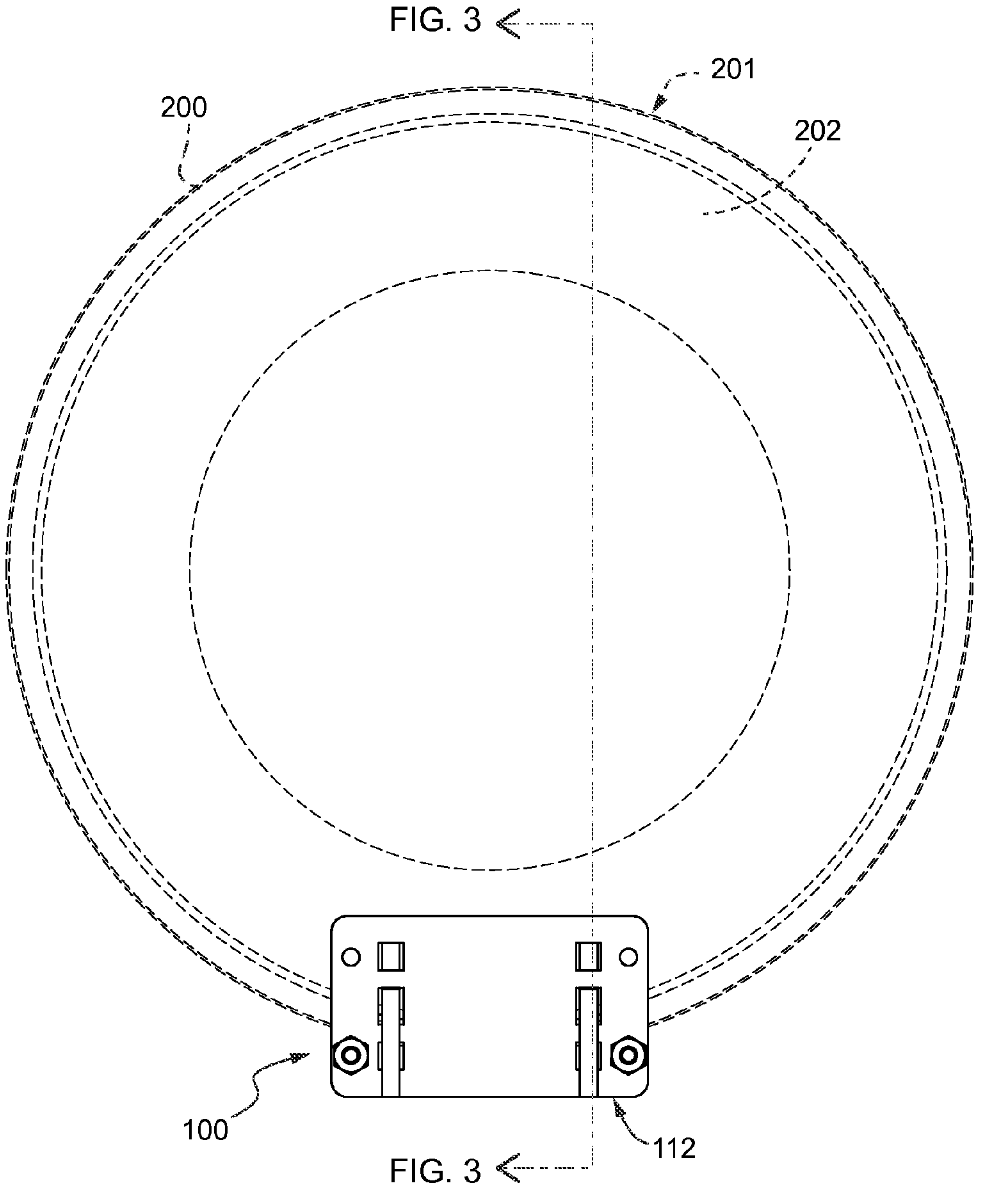
FIG. 2 is a reverse side view of a mounting box clamp of the invention showing a section line as depicted of the following figure.

FIG. 2 is a reverse orthogonal view of a mounting box clamp 100 of the invention and shows a section line of the cross-section as depicted of the following figure. Shown is the thickened perimetrical lip 201 and top web 202. Each disc is axisymmetric around a centerpoint which generally corresponds to a mold injection port. Also shown is the back plate 112 of the box clamp body.

Figure 3:
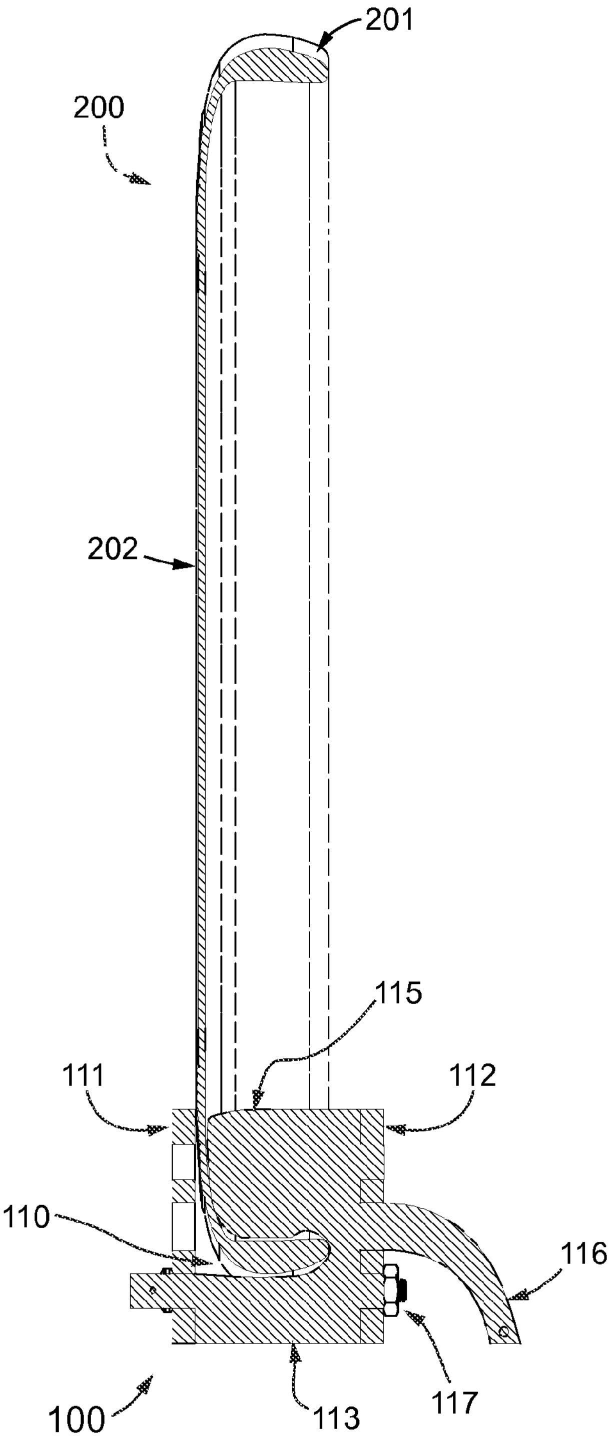
FIG. 3 is a cross-sectional orthogonal view of the mounting box clamp as cut in FIG. 2.

FIG. 3 is a cross-sectional orthogonal view of the mounting box clamp as located in FIG. 2. The section line is drawn through the interdigitating pegs of the box clamp assembly.

The cut line is oblique where it passes through the lip of the flying disc, and the thickness of the lip 201 relative to the thin top web 202 is readily apparent. The representation is idealized in that the aerodynamic curvature of the disc topside face is somewhat flattened.

Also shown is a side bracket 113. A prominent arcuate slot 110 is defined in the side brackets. The slot is cut so as to closely engage the lip edge or rim of the disc. The top web is contacted by the front platen 111 and squeezed against a thumb 115 defined as an upper aspect of the side bracket above the slot 110. The side bracket shown here also includes a curved leg 116 that extends to the rear of the box clamp and provided added stabilization for the disc in the standing position (as shown here).

Also shown is a bolt and nut 117 used to reversibly stiffen the box clamp assembly. Other fixative hardware or glues may be used if desired. Snap-together features such as dovetailing are effective in achieving the desired stiffness of the box.

Figure 4:
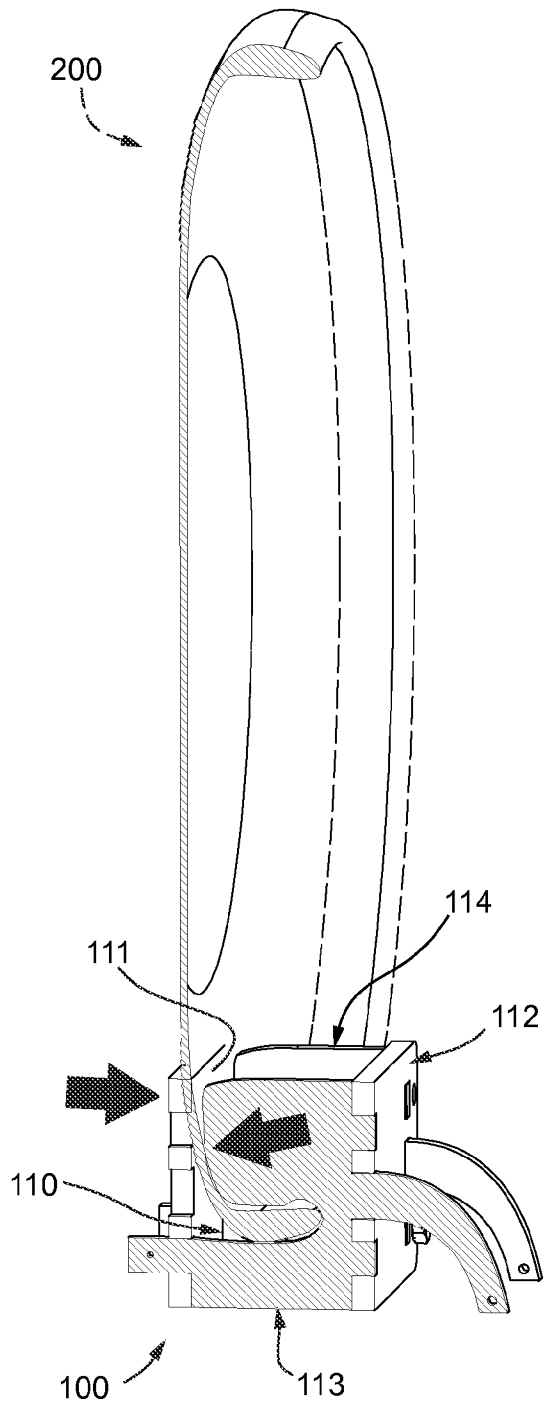
FIG. 4 is a perspective of the cross-sectional view of the preceding figure, showing an interference fit between the clamp front platen and the curvature of the flying disc. Interference is resolved by compressing the disc when held in position in the box clamp.

FIG. 4 is a cross-sectional view of the preceding figure in perspective. In this fully assembled view, the box clamp has four walls (front platen 111; back plate 112; first side bracket 113; second side bracket 114) and immobilizes a segment of the edge lip and web of the disc under a gentle squeezing pressure between the front platen and the thumb 115 of the side bracket and as held in place by the contoured dimensions of the slot. Curves of this kind can be CAD designed and laser cut, for example. The interdigitating pegs at the connections of the box frame members are also laser cut as shown and fit tightly. The top and the bottom of the box clamp body are open.

The top web has a topside or "outside" face and a downside or "inside" face, as would be readily understood by one skilled in the art. The surrounding perimetrical lip and top web define an inside hollow space useful for aiding the player in grasping the disc by the edge lip. The wing-like curvature of the topside face is aerodynamically curved and contributes to the flying capability of the disc.

Also shown (bold arrows) in this view is an interference fit between the clamp front platen and the curvature of the flying disc. The interference, which is represented schematically by an overlap of the top inside corner of the front platen 111 and the top web (202, seated in front of thumb 115) is resolved by compressing the disc when held in position in the box clamp. Because of the pliancy of the disc, the deformation is smooth and reversible, and aids in stiffening the mounted disc in the clamp. This interference is exaggerated in this schematic view for clarity.

The box clamp in this view resembles the thumbs of a hand (front platen) and a large thumb of the side bracket. Thus it would appear that stabilizing an aerodynamically curved trophy disc is realized using two thumbs of one hand, a surprising finding. After testing discs of the art (which are standardized and mass produced), I determined that a front platen pressure in the range of about 10 gm to 200 gm [0.35 oz to 7.05 oz] resulted in a satisfactory degree of immobilization. The platen pressure refers to a pressure or weight equivalent needed to stabilize the disc in the slot. Using this range as a guide, the dimensions of the side slot (from back of the front platen to the dead end of the slot) were determined such that the disc was adequately but not excessively squeezed. The fixed dimensions insure an appropriate level of pressure when the box clamp body 100 is bolted together. When measured from the dead end of the slot 110 to the back surface of the front platen 111, a depth of about 2.9 cm is found, but a range of dimensions may be used such that a gentle pressure is applied. The edgewise height of the disc at center is about 3.3 cm. A clearance for the disc is provided between the front end of the thumb 115 and the front platen and generally corresponds to the thickness of the top web or a little more.

Figure 5A:
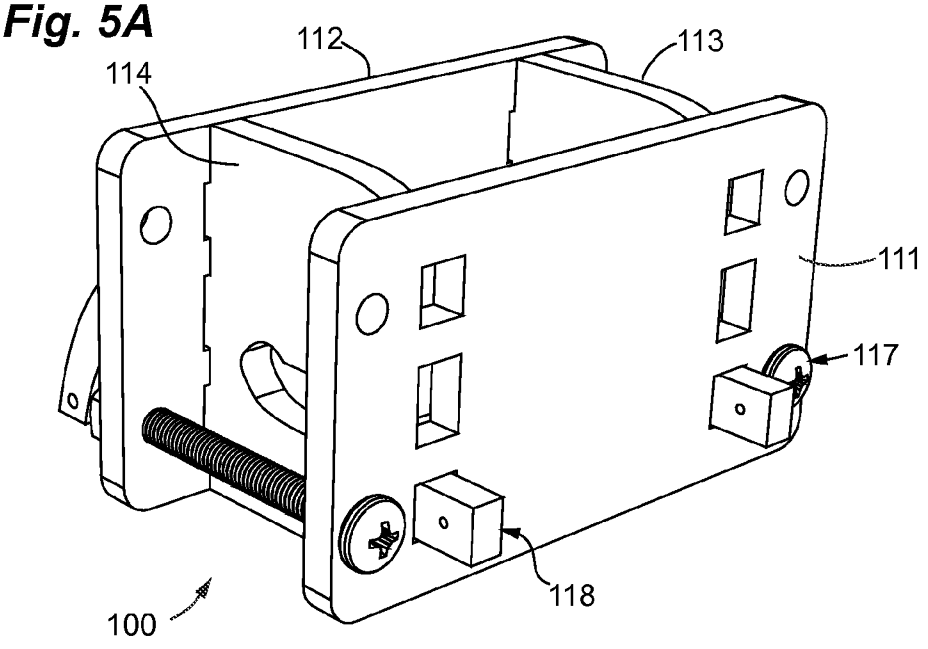
FIG. 5A shows the box clamp at a first perspective angle.

FIG. 5A shows the four walls of the box clamp assembly at a first perspective angle. Visible are the front platen 111, the back plate 112, a first side bracket 113 and a second side bracket 114, where the side brackets are sandwiched between and interdigitated with the front and back walls. Also shown is mounting hardware. Not shown is a disc, but a view of the mounting slot 110 for the disc is provided; a better view is given in the following figure.

Figure 5B:
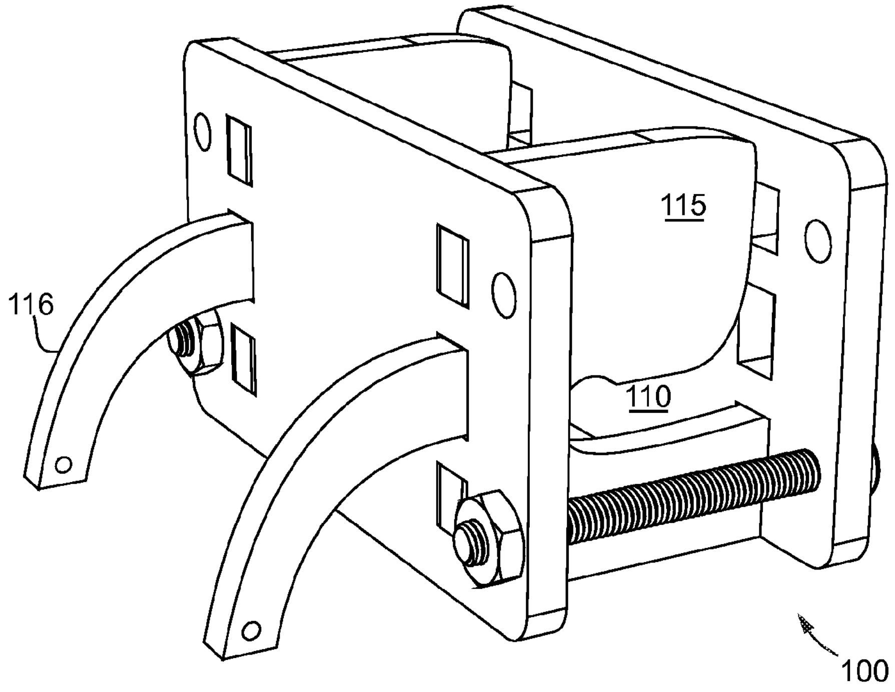
FIG. 5B shows the box clamp at a second perspective angle.

FIG. 5B shows the box clamp assembly at a second perspective angle. The mounting slot 110 is identified in the side brackets. Two curved legs 116 extend from the back plate. The front platen and back plate are held together in this embodiment by a machine screw 117 with nut. The box clamp body is open at the top and the bottom. All the upper and lower edges may be flush seated on any flat surface. The holes in the pegs 118 or legs 116 allow for hanging the body (with disc) using wires from any vertical surface.

The front and back plates may be assembled in three relative orientations, two of which are degenerate. The configuration shown here is used so that the curved legs 116 rest on flat feet against a supporting horizontal surface and stabilize a disc held upright in the clamp (see FIG. 9). However, by inverting the curved legs, a hanging disc may be hung angularly from a wall so as to be viewed by looking up at it. In this hanging configuration, the back rails of the curved legs rest against the wall and are self-seating when a wire is suspended between the two holes in the legs (see FIG. 8).

Figure 6:
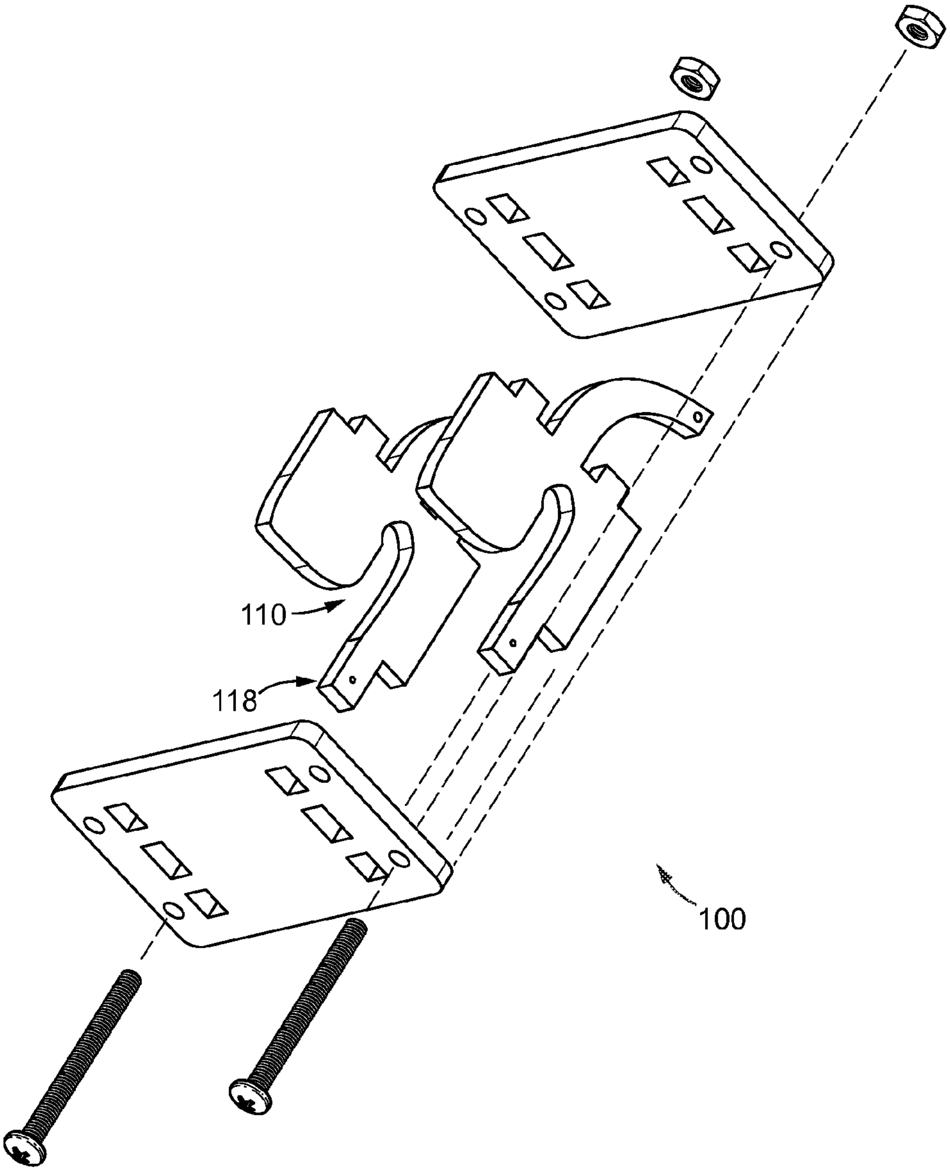
FIG. 6 depicts an exploded view of the box clamp assembly without disc.

FIG. 6 depicts an exploded view of the box clamp assembly 100 without disc and describes an exemplary design of a box clamp adapted for clamping the edge lip of a flying disc for display. Substitutions may be made to construction details such as the nature of the fastener and the interdigitating pegs 118 so as to achieve a satisfying trophy display mount. For example, pre-sized snap pins or D-screws may be used in place of Philips head bolts. A brass plate may be affixed (by mounting it on the respective front platen or back plate) so as to face front when the disc is displayed. Engraving on the plate may include details of the trophy, a date and place, a championship match, the names of team members, and so forth. Decorative decals or signatures may also be added to the top or underside face of the disc itself, adding historical value and interest to the display.

Figure 7:
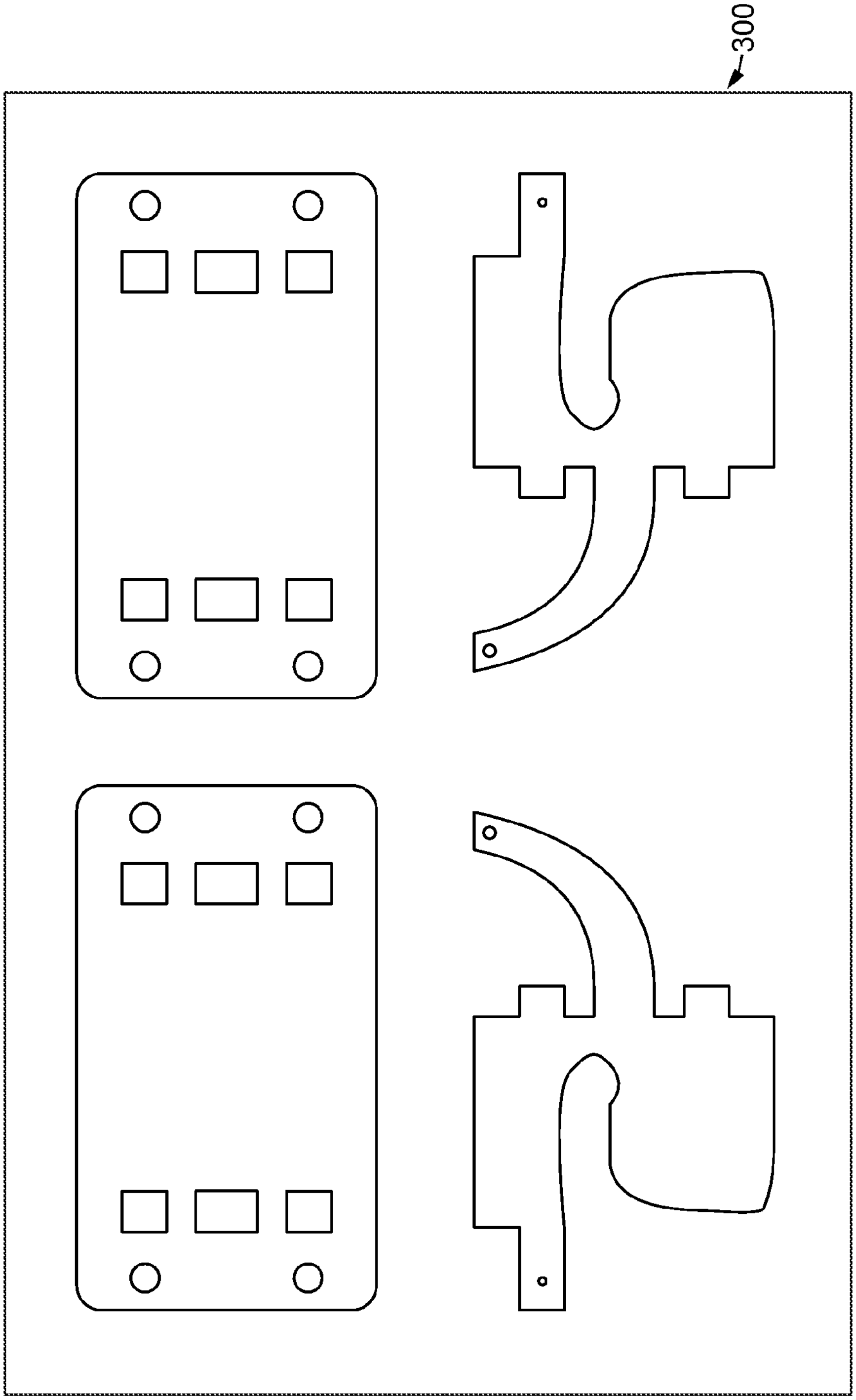
FIG. 7 in plan view shows a stencil for cutout of the parts of the box clamp.

FIG. 7, in plan view, shows a stencil 300 for cutout of the parts of the box clamp. Conservation of materials may be achieved by a tighter tessellation, but the figure illustrates principles involved in making a single box clamp or making a mass production run of box clamps from sheet stock. The cutting line or vector data may be supplied on a compact disc or webpage for "do-it-yourselfers", or pre-cut parts may be supplied as part of a kit with any needed mounting fasteners or glue and the appropriate instruction sheets or decals. The design is surprisingly flexible in that each part can be used in four different orientations, allowing different textures, colors, designs and surface characteristics to be selected by the end user before final assembly.

Figure 8:
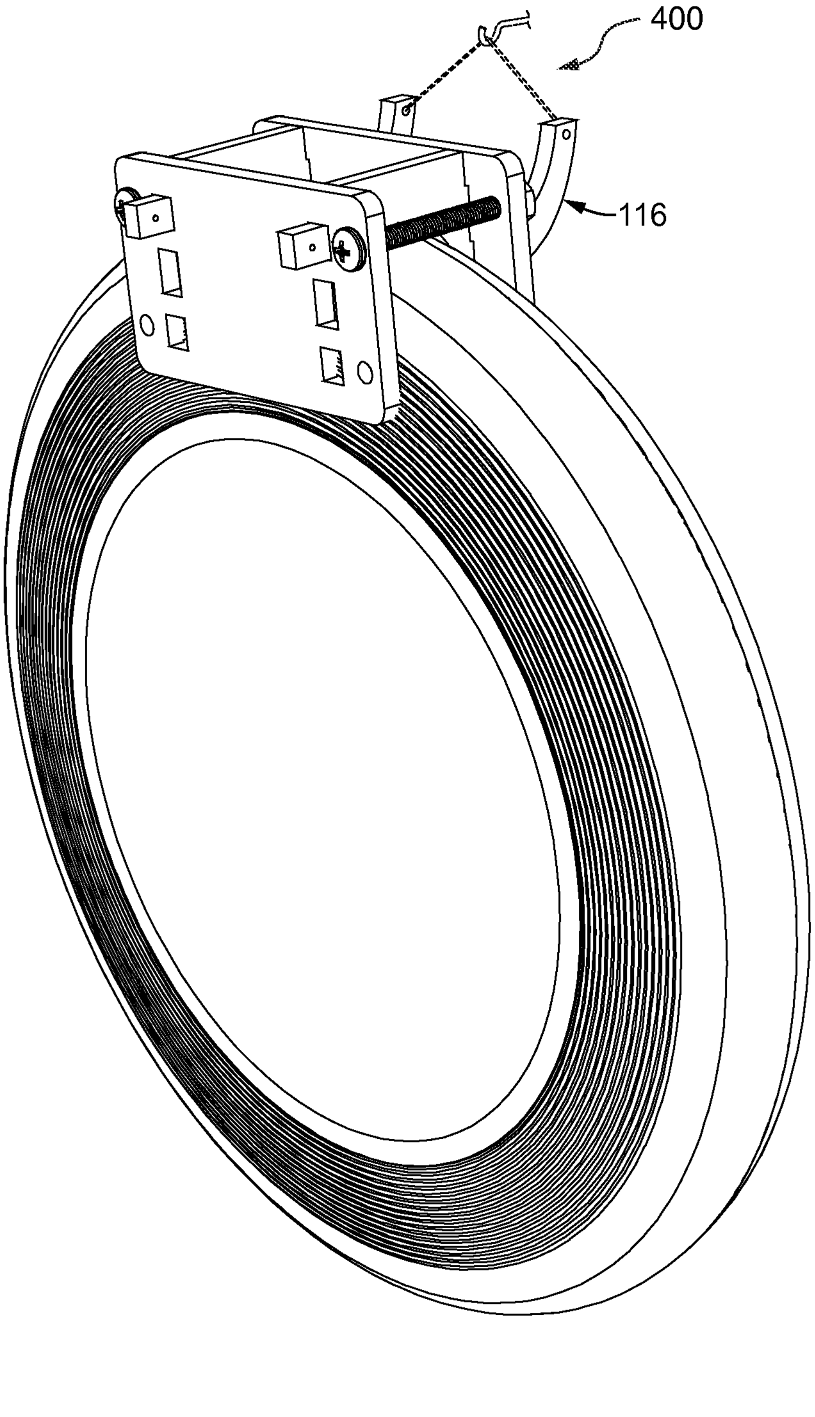
FIG. 8 is a perspective view demonstrating a method of pendently mounting a flying disc in a box clamp of the invention.

FIG. 8 is a perspective view that demonstrates a method of pendently mounting a flying disc in a box clamp of the invention. Shown are exemplary details of a hanging fastener system 400. The curved legs 116 serve as a rocking rail pair, allowing the disc to hang in a three-point landing on any flat vertical surface, such as a wall or in a display window. Alternatively, the disc may be displayed standing on its legs, as shown in the next figure.

Figure 9:
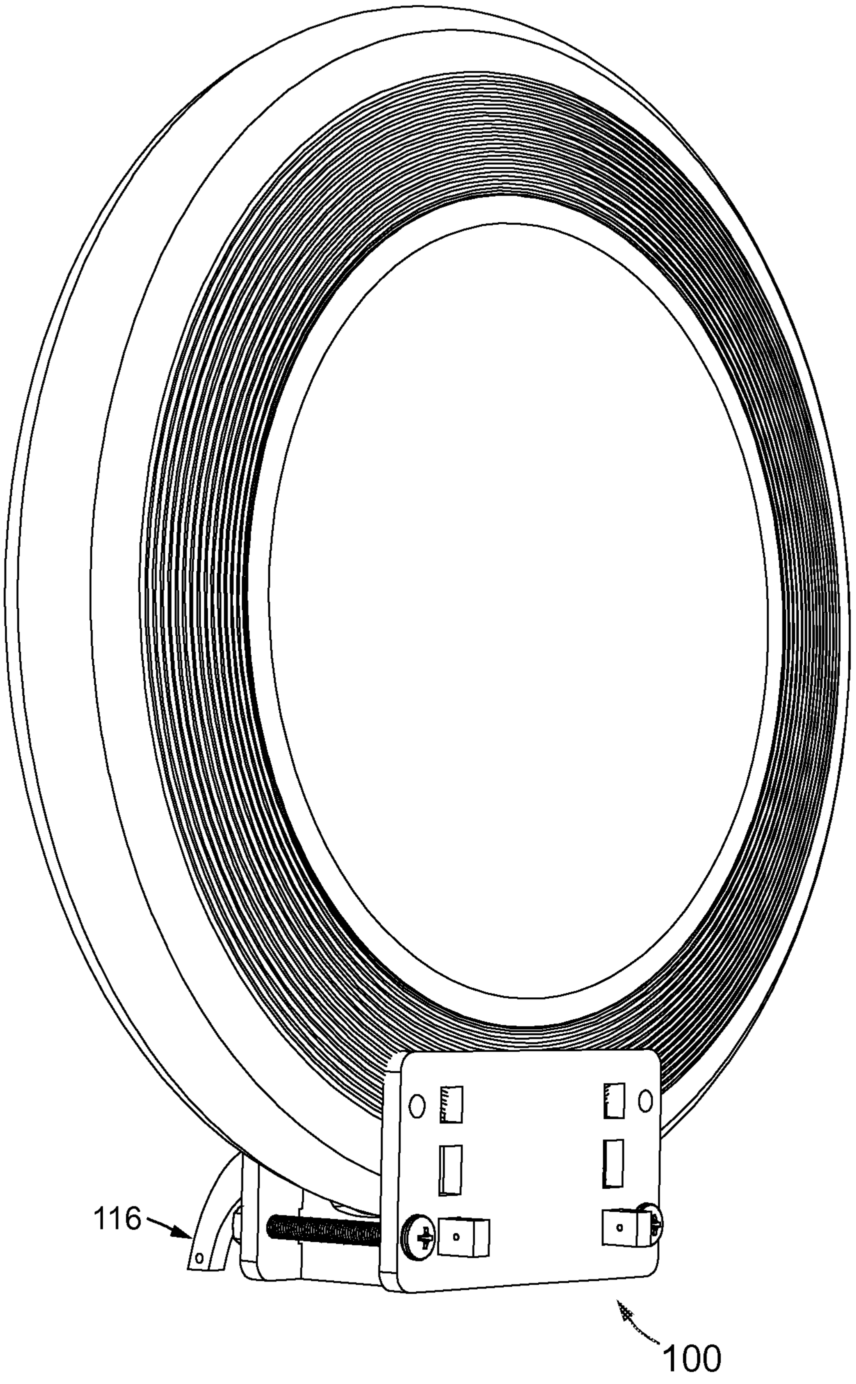
FIG. 9 is a perspective view, demonstrating a second method of uprightly mounting a flying disc, such as on a desktop.

FIG. 9 is a perspective view, demonstrating a second method of uprightly mounting a flying disc, such as on a desktop. Curved legs 116 extend the support base. In this view the box clamp body forms a flush rectangular frame that supports the lower edge of the disc while fully exposing the center zone of the topside face (most commonly used by manufacturer's to supply logos and other decorative art).

The box clamp allows the disc to be displayed frontwise (with aerodynamic topside face of the disc displayed) or backwise (with the underside displayed). The advantage of a backside display is that the signatures of the team are typically signed on the underside, so display of the backside is desirable. Advantageously, the components of the box frame may be re-arranged to facilitate this. The box frame may not simply be turned 180 degrees to accomplish this because of the side brackets do not have a mirror axis of symmetry but instead have unique pegs and a stereospecificity of the slot, allowing a multiplicity of choices in how to hang or stand the disc in its box clamp.

INCORPORATION BY REFERENCE

All of the U.S. patents, U.S. patent application publications, U.S. patent applications, foreign patents, foreign patent applications and non-patent publications referred to in this specification and related filings are incorporated herein by reference in their entirety for all purposes.

Scope of the Claims

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

I claim:

1. A method for displaying an ultimate trophy disc in either an erect standing and upright position or a hanging and dependent position, the ultimate trophy disc having a thin top web and an edge with thickened circumferential lip, the lip and web having a wing-like curvature, the web having a topside face defined by said wing-like curvature and an underside face defining a hollow area inside said circumferential lip, which comprises (a) providing a back plate defining a back of a box clamp, a front platen defining a front of said box clamp, and two side brackets defining two sides of said box clamp, wherein each said side bracket comprises a slot such that each said slot is configured with a thumb to fittingly receive the shape of said circumferential lip at either side of said box clamp;

(b) securing a segment of said circumferential lip and web of said disc in said box clamp by:

(i) assembling said back plate and said two side brackets to define a three-sided rectangular intermediate;

(ii) inserting a segment of said circumferential lip into said slots in said side brackets;

said thumb contacting engaging said underside face;

(iii) clampingly immobilizing said segment under pressure by affixing said front platen onto said side brackets, thereby forming a four-sided box clamp around an edge segment of said disc, said disc captive therein; and, (c) displaying said box clamp with captive disc in a standing or a pendent position.

2. The method of claim 1, wherein said front platen is configured for applying a clamping force sufficient to immobilize said disc in said box clamp.

3. The method of claim 1, wherein said front platen is configured for applying a clamping force equivalent of 10 to 200 grams to said disc in said box clamp.

4. The method of claim 1, wherein said side brackets comprise extension legs, wherein said extension legs extend outside the body of said box clamp and are capable of supporting said disc in an upright position on a desk or shelf.

5. The method of claim 4, wherein said extension legs are curved so as to define each a posterior leg surface or edge that is enabled to angularly cant said box clamp in an inverted position from a wall or post when said box clamp and disc are suspended by a wire or a hook.

6. The method of claim 2, further comprising using fasteners to clamp the side brackets, capturing said disc in place in said slots between said front platen and said back plate, such that a) the lower edges of the four-sided box as assembled defines a rectangular base for standing the captive disc in an upright position; and, b) the front or back of said box clamp are configured with holes for hanging said captive disk from a supporting wire and hanger so as to display the disc pendent on a vertical surface.

7. The method of claim 6, further comprising providing any hardware to be used in assembling the box clamp.

8. The method of claim 7, further comprising providing a length of wire and a wall-mounting pin to be used in pendantly displaying the box clamp with captive disc.

9. The method of claim 1, wherein said side brackets, front platen, and back plate are configured with interdigitating pegs for assembling said box clamp.

10. The method of claim 9, comprising providing a middle peg of said interdigitating pegs of each said two side brackets with an extended and curved leg for standing said disc in an upright position with said legs extending forward or backward for said box clamp.

11. The method of claim 10, comprising providing each of said extended and curved legs with a pre-drilled hole for displaying said disk pendantly suspended from a wire strung between said holes.

12. The method of claim 11, comprising providing a lower peg of said interdigitating pegs of each said two side brackets with an extended peg having a pre-drilled hole for displaying said disk pendantly suspended from a wire strung between said holes.

* * * * *